United States Patent [19]

Bishop

[11] Patent Number: 5,046,120

[45] Date of Patent: Sep. 3, 1991

[54] METHOD OF AND APPARATUS FOR INCREASING THE PROCESSING SPEED IN THE SCANNING INSPECTION OF CIRCUIT BOARDS AND OTHER OBJECTS

[75] Inventor: Robert Bishop, Brookline, Mass.

[73] Assignee: Beltronics, Inc., Brookline, Mass.

[21] Appl. No.: 335,283

[22] Filed: Apr. 10, 1989

[51] Int. Cl.⁵ .......................... G06K 9/60; G06K 9/56
[52] U.S. Cl. .......................................... 382/54; 382/8; 358/106
[58] Field of Search ....................... 382/8, 54; 358/106

[56] References Cited

U.S. PATENT DOCUMENTS

| | | | |
|---|---|---|---|
| 4,589,140 | 5/1986 | Bishop et al. | 382/8 |
| 4,747,156 | 6/1986 | Wahl | 382/54 |
| 4,853,794 | 8/1989 | Fukumoto et al. | 382/54 |
| 4,962,541 | 10/1990 | Doi et al. | 382/8 |

Primary Examiner—Leo H. Boudreau
Assistant Examiner—Rohini Khanna
Attorney, Agent, or Firm—Rines and Rines

[57] ABSTRACT

To reduce the large number of pixels resulting from camera scanning of objects in which defects, features or differences are to be detected, and thus enhance processing speed, larger pixels are generated composed of groups of the smaller pixels, but with the smaller pixel information obtained from scanning conveyed by neighborhood majority binary value monitoring to the larger pixels, such that increased data rate is effected through processing the larger pixels without, however, loss of defect, feature or difference information contained in the small pixels.

11 Claims, 6 Drawing Sheets

FIG. 1
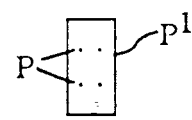
FIG. 2A
```
111111111111111111111111111111111
111111111111111111111111111111111
111111111111111101111111111111111
111111111111111111111111111111111
111111111111111111111111111111111
111111111111111111111111111111111
```
FIG. 2B
```
00000000000
00000000000
00001000000
00000000000
00000000000
00000000000
```
FIG. 2C
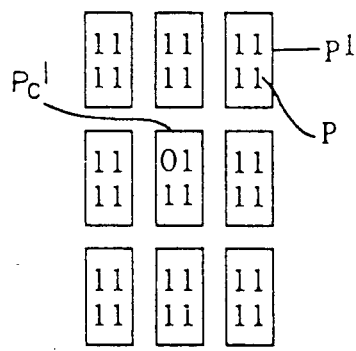
FIG. 2D
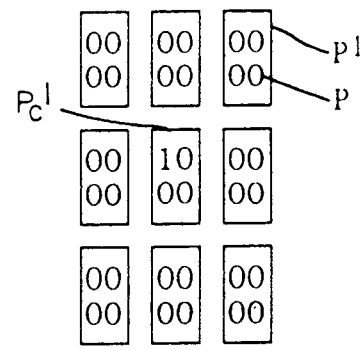
FIG. 3A
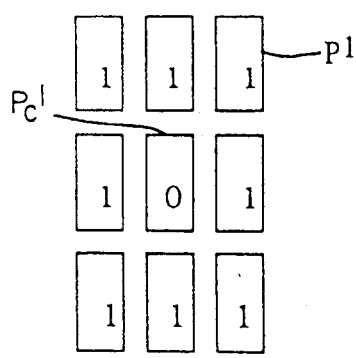
FIG. 3B
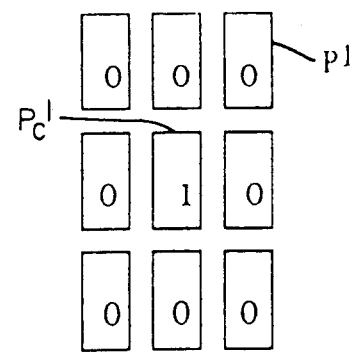

FIG. 4A
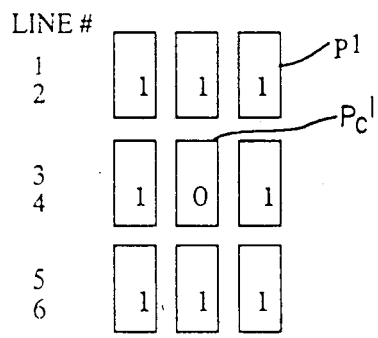
FIG. 4B
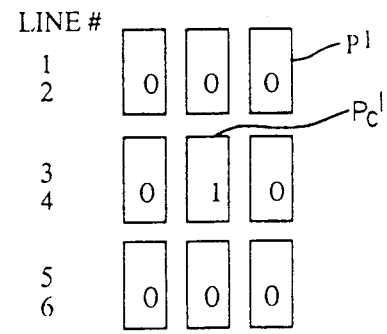
FIG. 5
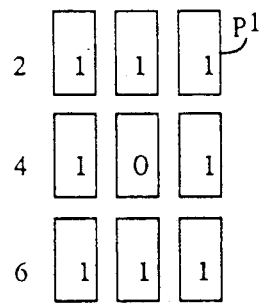
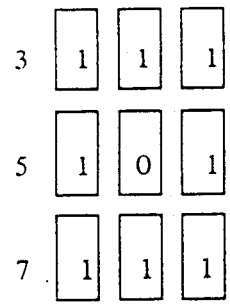

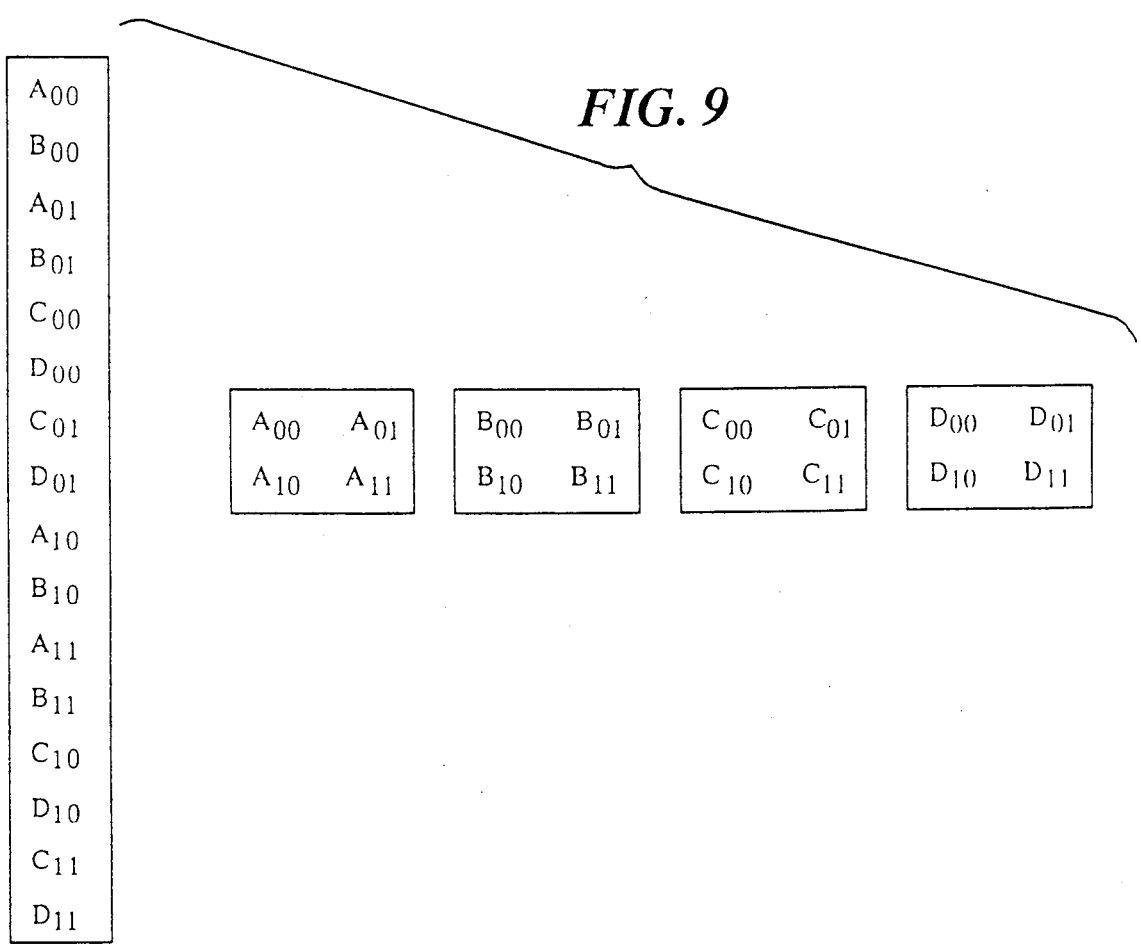

METHOD OF AND APPARATUS FOR INCREASING THE PROCESSING SPEED IN THE SCANNING INSPECTION OF CIRCUIT BOARDS AND OTHER OBJECTS

The present invention relates to image-scanning inspection systems, such as used in the detection of faults or defects in printed circuit boards and other objects, being more particularly directed to systems of the type described, for example, in my earlier U.S. Pat. No. 4,589,140, and other inspection systems, as well, and to the improvement in increasing the effective processing speed of operations thereof.

As described in said Letters Patent, for example, techniques are successfully used to scan at rapid speeds printed circuit boards or other surfaces and to monitor the detection of defects, irregularities or other features in the boards that deviate from known or accepted features. Included in such prior systems are the Circuit One apparatus of Beltronics, Inc. of Brookline, Mass., assignee of the present invention, which operates in accordance with the methodology and apparatus disclosed in said above-entitled Letters Patent.

There are occasions, however, where it is desired to increase the throughput speed of inspection; and the present invention is directed to achieving such through a novel pre-processing method or technique that, while particularly adapted for inspection systems of the above-described type, are more generally applicable to other types or philosophies of scanning inspection, as well.

An object of the invention, accordingly, is to provide a new and improved method of and apparatus for the inspection of defects, irregularities or other features in surfaces and in which increased speed of throughput is attained by novel pixel pre-processing techniques.

Other and further objects will be explained hereinafter and are more particularly pointed out in connection with the appended claims.

The invention will now be described with reference to the accompanying drawings, FIG. 1 of which is a diagramatic view of a large pixel composed of small camera pixels for use in accordance with the method underlying the invention;

FIGS. 2A and 2B are binary representations of an array of pixels representing the optical scanning detection, respectively, of exemplary pinhole and speck defects;

FIGS. 2C and 2D are diagrams similar to FIG. 1 of the sets of larger pixels of the invention for the respective cases of FIGS. 2A and 2B;

Figure 6:
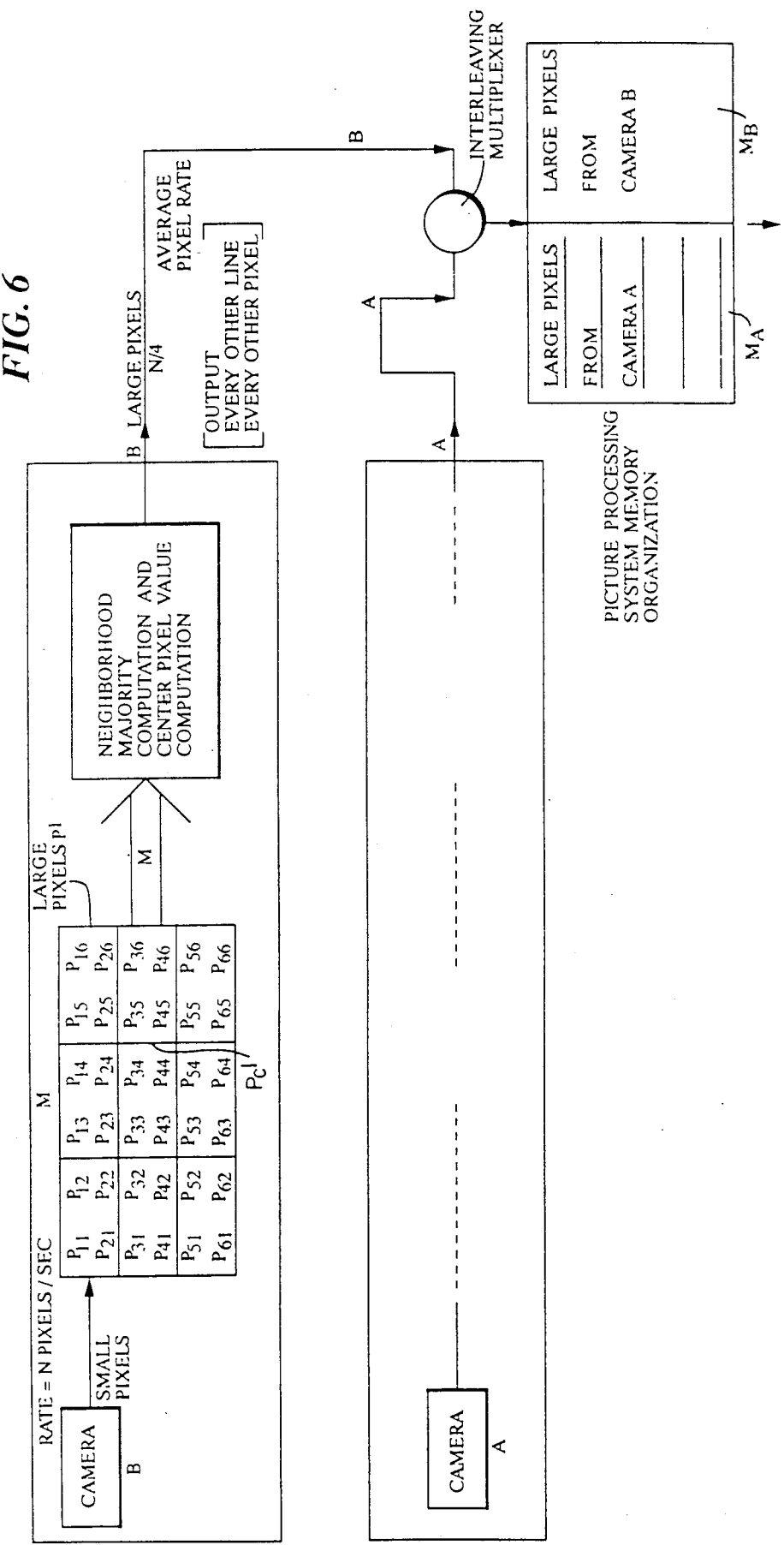
Figure 7:
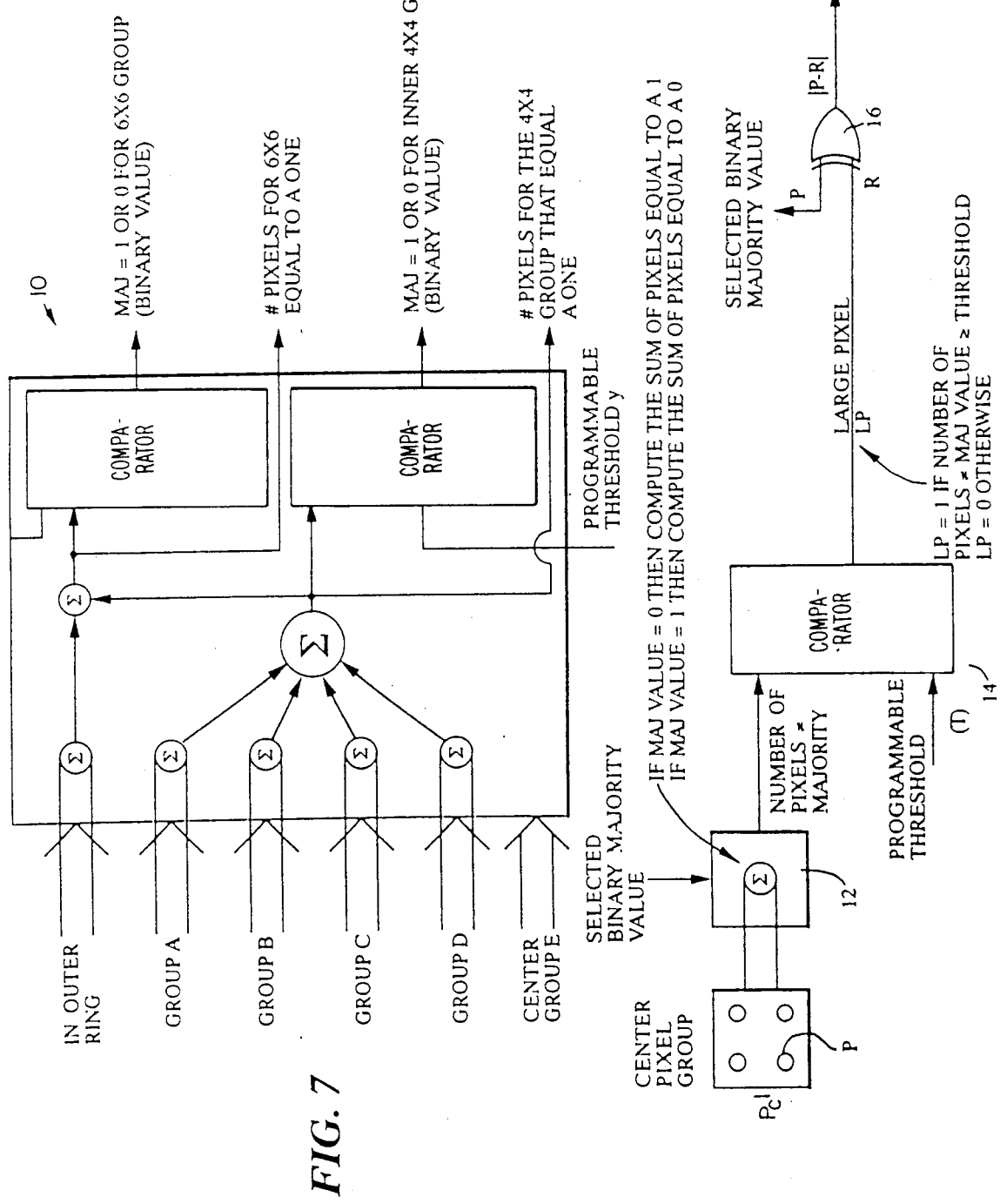
Figure 8:
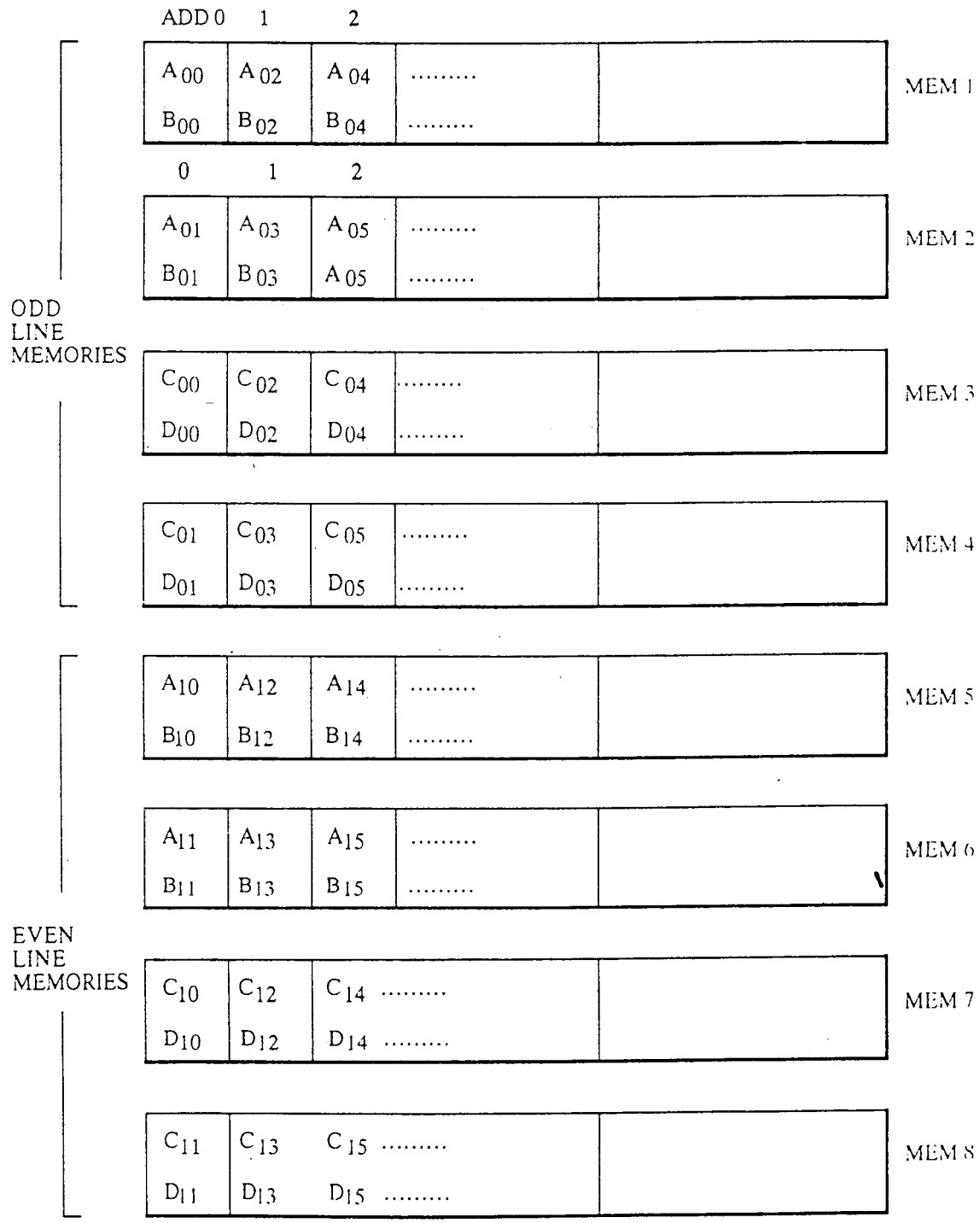

FIGS. 3A and 3B correspond to the cases of FIGS. 2C and 2D, respectively, with appropriate binary value assignments resulting from majority neighborhood value determination;

FIGS. 4A and 4B correspond, respectively, to the circumstances of FIGS. 3A and 3B, illustrating camera timing and line assignments;

FIG. 5 is similar to FIGS. 4A and 4B illustrating two-camera interleaving;

FIG. 6 is a block circuit diagram of a preferred pre-processor operating in accordance with the invention;

FIG. 7 is a similar diagram of a circuit for majority value determination and assignment and including broader region majority value determination as shown in FIG. 7A; and FIGS. 8 and 9 are block and flow diagrams of a preferred implementation of the systems of FIGS. 6 and 7.

In summary, from one of its broader aspects, the invention embraces a method of increasing the processing speed of optical scanning in which an object is scanned by a camera to determine defects, features or differences, that comprises, scanning the objects to generate binary value small pixels corresponding to the presence or absence of physical characteristics; generating from the small pixels a set of larger pixels each constituted of a group of the small pixels; conveying to the larger pixels defect, feature or difference information contained in one or more of the small pixels constituting the same; and processing the larger pixels at a data rate or processing speed that is a multiple of that achievable in processing the small pixels, while maintaining the information from the scanning that is contained in the small pixels. Preferred and best mode embodiments and details will later be presented.

Considering the illustration of circuit board inspection as an example, current high-speed inspection systems of the above-described and related types must be designed to detect very small defects, such as hairline breaks, hairline shorts, pinholes, specks and critical minute errors. To do so, very small picture elements must be chosen, referred to as pixels, that are sufficiently small to enable the detection of such small defects. Unfortunately, however, when pixel size is very small, and the objects such as the circuit boards are large, there are a very large number of pixels to process. To reduce such large numbers of pixels, and thus enhance the processing speed, the present invention provides a scheme whereby larger pixels are generated (actually groups of smaller pixels). Inspection is made of the information within the group of smaller pixels to determine whether the same contains a defect or region of difference from its surrounding pixels; and, if so, this information is conveyed to the larger pixel. Thus, the number of pixels is reduced by converting the small pixels into larger pixels or pixel groups, and the data rate is accordingly reduced while still maintaining the information contained in the small pixels through conveying such information to the large pixel group.

Camera pixels P, FIG. 1, have binary values of 1 or 0 to denote the presence or absence of conducting material or other physical characteristics or features. The larger pixel $P^1$ (shown composed of four camera pixels P), like the camera pixel P, has also a binary value of 1 or 0; but the binary value is computed in such a way as to accentuate in the large pixel $P^1$ small defects or variations, so that they are detected by the shape-recognition algorithm, as of said Letters Patent, which will then process the larger pixels.

This process will now be explained with the aid of FIGS. 2A and 2B which respectively show a pinhole in a printed circuit line (indicated by a 0) and a speck in the board laminate (indicated as a 1). To compute the value of a large pixel $P^1$ one examines the neighborhood of at least an array of six-by-six camera pixels P which is equivalent to at least a set of three-by-three large pixels $P^1$, FIGS. 2C and 2D. The value of the neighborhood is said to be the majority value of the camera pixels surrounding the center four camera pixels. For example, with the pinhole, FIG. 2C, the majority equals a 1; and for the speck, FIG. 2D, the majority equals 0. The number of pixels that differ from the majority value is computed. The value of the center large pixel $P_c^1$, FIGS. 2C and 2D, is then set equal to the opposite value of the neighborhood if a certain or some minimum number T of the pixels in the center group differ from the neighborhood to accentuate the pixel that is different. Otherwise, it is set equal to the same value as the neighborhood. Thus, for the pinhole of FIG. 2C, the large pixels $P^1$ will have the values shown in FIG. 3A, where the center larger pixel $P_c^1$ is 0 because of the 0 information within the center larger pixel of FIG. 2C. Similarly, the center pixel $P_c^1$ of FIG. 3B, for the case of the speck in the laminate, reflects by its 1 value, that information within the center large pixel $P_c^1$ of FIG. 3B.

Relative to camera timing, the large pixels $P^1$ are computed every other camera pixel and every other camera line. FIGS. 4A and 4B indicate the output values of the large pixels relative to camera line number and pixel timing for the respective pinhole and speck examples of respective FIGS. 3A and 3B. Large pixels are shown computed on the occurrence of an even line (line numbers 2, 4, and 6) and pixel number.

The pattern recognition processors of the present invention operate at the data rate of the large pixels $P^1$, which is half the camera pixel data rate. This could correspond to, for example, 10 megahertz for a 20 megahertz camera. In addition, since the system must operate on images without missing lines, processor data can only be analyzed on alternate camera lines.

Conceptually, since in a 20-megahertz system, large pixels $P^1$ are produced on alternate or even-numbered camera lines, half the time there is no data to process. Thus, to utilize this time effectively and to achieve a benefit from the rate reduction of the invention, one could interleave two cameras to double the throughput rate; one producing large pixels on odd-numbered lines, and the other camera producing pixels on even-numbered lines as illustrated in FIG. 5. In this configuration, the two cameras would view adjacent strips on the printed circuit board.

To take full advantage of the two cameras in conjunction with the processing system, effectively a single processor is provided in which the memory is subdivided into two halves; one for one camera path A, FIG. 6, and the other side or part of the memory would support camera path B. Thus the two cameras A and B may be interleaved on alternate lines and place their data into corresponding $M_A$ and $M_B$ sides of memory such that the system would process data in the same mode and in conjunction with the same technique described in said Letters Patent and in the previously-mentioned Circuit One system.

The beauty of this technique for interleaving odd and even lines is that, in reality, only one common data processing channel is required. Since the memory itself is divided into that region of memory $M_A$ that stores and builds pictures and data from camera A and that part of memory $M_B$ that will store the picture from camera B, all that is required is a sufficiently large memory to store the pictures from the two camera systems. The processing electronics that feeds the memories and all the data-processing electronics around the memories, however, only need to be in a singular form since at no instant in time are both camera A and B large pixel data available simultaneously. Data is read from camera A, it is processed through the system and it is stored in that region of memory $M_A$ allocated for camera A. On the next line, the data from camera B is placed into memory $M_B$ allocated for storing its large pixel images. Thus, only one processor is needed and therefore the final result is achieved of being able effectively to process data at four times original speed.

In the example of FIG. 6, the smaller pixels $P_{11}$–$P_{66}$ make up the three-by-three larger pixels $P^1$, with the neighborhood majority and center pixel value computation effected as before described; namely, the value of the center larger pixel $P_c^1$ is not equal to the majority value if more than T pixels within the center group differ from the majority value. This accentuates camera pixels $P_{33}$, $P_{34}$, $P_{43}$, $P_{44}$ that differ from their surroundings and which are often defects. This information is thus conveyed into the large pixel group while dropping the average rate by a factor of four.

As an example of the effective data rate compression from the camera to the final output, assume the two cameras are operating at a given data rate N; such as 20 megahertz. The data from the camera, FIG. 6, is subsampled into the larger pixel groups $P^1$ to produce a reduction of at least a factor of two; so that the 20 megahertz data rate with the large pixels $P^1$ is effectively a N/2 data rate, or 10 megahertz on every other line. By interleaving the data from the two cameras (Multiplexer, FIG. 6) the processor only runs at a continuous 10 megahertz rate while both cameras A and B are continually running at the 20 megahertz data rate. Thus, two cameras at 20 megahertz each produce an effective, true scanning board speed of 40 megahertz, though the processor is only processing data at 10 megahertz.

In this illustration of the technique underlying the invention, the simplest approach has been taken of producing large pixel groups $P^1$ containing only four smaller pixels P which produce a net average data rate reduction of a factor of four. Generally, more than four pixels in a larger pixel group may be employed, if desired: three-by-three, four-by-four, ... M-by-M, for that matter; and also two-by-three, etc. The reduction would correspond to the number of pixels P in a large pixel group $P^1$. As a further illustration, if instead of using an array of two-by-two smaller pixels P yielding an average reduction rate of four, if three-by-three were employed, there would be a reduction of nine. Four-by-four would produce a reduction of sixteen, etc., with corresponding processing speed increases.

Furthermore, while the earlier example of FIGS. 2A-6 involve a general neighborhood of the set of three-by-three large pixels $P^1$, corresponding to six-by-six small pixels, other numbers may be used, such as a set of four-by-four large pixels, or five-by-five, as further examples; and the only thing that would increase is some of the processing hardware immediately used to compute the majority value. Since hardware, however, is becoming cheaper and more dense, it appears that in the immediate future, practice will not be limited to using the exemplary three-by-three large pixels.

Another extremely important aspect is that when the value of the center larger pixel $P_c^1$ is computed, it is stated that the value of the center pixel group is not equal to the majority if more than some predetermined number of pixels (T) contained within the center group differs from the majority value. This accentuates pixels that differ from their surroundings and which are frequently defects that it is desired to detect in the inspection process. The specific threshhold value will vary and, in fact, can be varied to achieve different results. For example, if it is desired to scan a circuit board and have the system not learn very small defects, such as very small pinholes, the rule may be set that for a large pixel group $P^1$ to be different from its neighbors, a large number of small pixels P in that group must indeed be different from the majority; and if only one out of four pixels P is different (say constituting a very small pinhole), this will not be reflected at all, and the threshhold will accordingly be set. Likewise, at the time of inspecting the object, it may be desired to have the exact opposite results; i.e. finding a small pinhole wherein only one pixel differs from the majority. By varying the threshhold, the system can be tuned for such different applications.

Another way of fine tuning the results involves selecting the size of the neighborhood. If we start with a large neighborhood, and the number of pixels equal to a 1 are approximately 50 percent, one can choose a smaller neighborhood that yields a better estimate of the data pixels surrounding the center pixel. For example, if the large neighborhood contains 6×6 (36) pixels and the number of data pixels equalling 1 is 17, a 4×4 (16 pixel) neighborhood may be selected to determine the majority value. In addition, one can also compute the majority pixel value using 4 2×2 groups as shown in FIG. 7A. These groups may be referred to as groups A, B, C, D, enlarging and surrounding the four corners of the center pixel group E, the values of which corners are used to help determine the neighborhood majority value. The mechanism of selecting smaller neighborhoods to eliminate ambiguity increases the intelligence of the algorithm. If the number of pixels in the 6×6 group equal to a 1 are approximately 50%, then the majority value given by the smaller 4×4 local group is selected to yield a better estimate for the pixels around the center group E. If the value is not close to 50%, the binary value of the majority given for the 6×6 group is selected.

Shown in FIG. 7 is a block circuit diagram illustrating how the value of the center pixel group $P_c^1$ is determined as a function of the majority neighborhood value, the value of the center pixels in the center group, and the variable threshhold T. There is provided a computation circuit block 10, called the majority neighborhood value computation, which determines whether the majority of binary pixels is indeed a 1 or a 0. The center pixel group $P_c^1$ is assessed and its value determined as a function of the majority value. If the majority value is equal to 1, then the sum of points equalling a 0 in the center pixel group is computed in the summation circuit 12. If the majority value equals 0, then the sum of points equalling 1 in the center pixel group is computed. Thus, the output of the intelligent summing section 12 indicates the number of pixels which are not equal to the majority value. A comparison is then made in comparator 14 of the number of different pixels, with a threshhold input T that may be variable as a function of defect or detectable size, as before mentioned. The output of the comparator 14 that compares the majority of different pixels to their threshhold value T is equal to 1 if the number of pixels that differ from the majority exceeds the threshhold value. The output is 0, otherwise. The exclusive logical sum of the output of the comparator 14 and the actual majority value itself, is obtained by exclusive OR gate 16 yielding the value of the center pixel group $P_c^1$. Whenever the number of differing pixels in that center group $P_c^1$ exceeds the threshhold T, then the value of the center group is the opposite value of the majority; and, likewise, when the number of differing pixels is less than this threshhold T, the value of the center pixel remains the value of the majority. As before pointed out, a larger neighborhood about the center group (A, B, C, D, FIG. 7a) may also be selected.

It is important to emphasize that what has been above described is in essence a pre-processor. It does not assume or make any assumptions as to the type of processing to be followed. Thus it can be used as a preprocessor with many types of apparatus, whether it be line width measurement, pattern recognition systems, a system that stores data and desires to decrease the number of data bits that are being stored or other similar applications. The invention provides a rather generic preprocessor that can be applied to a large number of such processing systems.

A preferred method of implementation of the system of FIG. 7 uses four CCD cameras A, B, C and D and eight memories ("MEM1" through "MEM8"). Each memory is capable of storing one CCD camera line of data. This implementation uses 8K×8 bit memories (type PC164 made by the Performance Company) and 2500 element CCD's (CCD Type 181 made by Fairchild Company). During the first CCD clock cycle, the first pixel of each CCD is stored. Pixels $A_{00}$, $B_{00}$ are stored into MEM1, and $C_{00}$, $D_{00}$ into MEM3, as shown in FIG. 8. During the second clock cycle, the second pixel of each CCD is stored; $A_{01}$, $B_{01}$ into MEM2 and $C_{01}$, $D_{01}$ into MEM4, where $C_{xy}$ denotes camera C, line number x, pixel number y. Memories MEM1, 2, 3 and 4 are filled during the odd-numbered CCD scan lines. In a likewise fashion, memories MEM 5, 6, 7 and 8 are filled during even-numbered CCD scan lines. During the third CCD scan line, new incoming camera pixels are stored into the free half of memories MEM 1, 2, 3 and 4, while reading out large pixel groups from the previously filled other half of the same memory, corresponding to cameras A and B.

The memories (with a 25 nanosecond (ns) access time) are sufficiently fast to enable reading large pixel group data from one address and then writing new camera data into another address within one 100 ns cycle. Two large pixel groups are read out each clock cycle yielding a 2:1 increase per CCD scan line. The readout format is shown in FIG. 9. During line 4, new pixels are stored from cameras A, B, C, D into the free half of memories MEM 5, 6, 7 and 8, while reading out large pixels corresponding to cameras C and D. The total address space or length of each memory only needs to be one CCD line long since there are half as many large pixels as camera pixels per line. In general, this method can be expanded to handle more cameras by adding more memories.

As the large pixel groups are read out of the memories, they are placed into a vertical and horizontal delay line, (for example, fabricated using PC164 memories and 74374 type latches). These delay lines form the 6×6 pixel neighborhood shown in FIG. 7. The 36 total pixels are input to a programmable logic device (such as type EP1200 by Altera Company) which is programmed to compute the majority value of the neighborhood, and produce the value of the center pixel $P_c^1$ in FIG. 7, using the procedure described above.

Further modifications will occur to those skilled in the art, and such are considered to fall within the spirit and scope of the invention as defined in the appended claims.

What is claimed is:

1. A method of increasing the processing speed of optical scanning in which an object is scanned by a camera to determine defects, features or differences, that comprises, scanning the object to generate binary value small pixels corresponding to the presence or absence of physical characteristics; generating from the small pixels a set of larger pixels each constituted of a group of the small pixels; incorporating into the larger pixels defect, feature or difference information contained in one or more of the small pixels constituting the larger pixels, by examining a neighborhood within an array of small pixels equivalent to the set of larger pixels to determine the majority binary value of the small pixels constituting the neighborhood, and setting the value of the center larger pixel composed of the center group of small pixels to the said value of the neighborhood if a certain or minimum number of the pixels of the center group is equal to the said value of the neighborhood, and otherwise setting the value of the center larger pixel to the opposite binary value to accentuate at least one small pixel therein that is different; and processing the larger pixels at a data rate or processing speed that is a multiple of that achievable in processing the small pixels, while maintaining the information from the scanning that is contained in the small pixels.

2. A method as claimed in claim 1 and in which the said certain or minimum value is varied correspondingly to vary the increase in processing speed and/or to vary the size of the defect, feature of difference to be detected.

3. A method as claimed in claim 1 and in which the array of small camera pixels is at least six-by-six and the set of larger pixels is at least three-by-three.

4. A method as claimed in claim 1 and in which a pair of cameras is employed for the scanning, with the respective larger pixel sets generated in each camera path being stored, on alternate lines, in separate parts of a memory, and with a single common data processing channel for both camera paths.

5. A method as claimed in claim 1 and in which the small pixel defect, feature or difference is detected by shape recognition.

6. An optical inspection system preprocessing apparatus for use with camera scanning of an object to determine defects, features or differences, said apparatus having, in combination, camera means for generating binary value small pixels corresponding to the detected presence or absence of physical characteristics; means responsive to said small pixel generating means for developing therefrom a set of larger pixels each constituted of a group of the small pixels; means cooperative with the larger pixel set developing means for determining the majority binary value of a neighborhood comprising small pixels surrounding the center group of small pixels within the set of larger pixels; means for setting the value of the center larger pixel of the set composed of the center group of small pixels to the said value of the neighborhood if a certain or minimum number of the pixels of the center group is equal to the said value, and otherwise setting the value of the center larger pixel to the opposite binary value to accentuate at least one small pixel therein that is different; and means for enabling the processing of the larger pixels at a data rate or processing speed that is a multiple of that achievable in processing the small pixels, while maintaining the information from the scanning that is contained in the small pixels.

7. Apparatus as claimed in claim 6 and in which means is provided for varying said certain or minimum number to effect at least one of varying the increase in processing speed and varying the size of the defect, feature or difference to be detected.

8. Apparatus as claimed in claim 7 and in which the set of larger pixels is at least three-by-three, with the small pixels in each large pixel at least two-by-two.

9. Apparatus as claimed in claim 6 and in which a pair of cameras is employed for the scanning and wherein means is provided for storing in separate parts of memory means, on alternate lines, the respective sets of larger pixel sets developed in each camera path, and with a common data processing channel for both camera paths.

10. Apparatus as claimed in claim 9 and in which four cameras are employed with four odd-line and four even-line memories.

11. Apparatus as claimed in claim 6 and in which said neighborhood is comprised of four adjacent large pixel groups each containing a respective one of four camera pixels of the center larger pixel.

* * * * *